No. 835,696. PATENTED NOV. 13, 1906.
W. N. APPLETON.
LINK CLOSING DEVICE.
APPLICATION FILED DEC. 1, 1905.
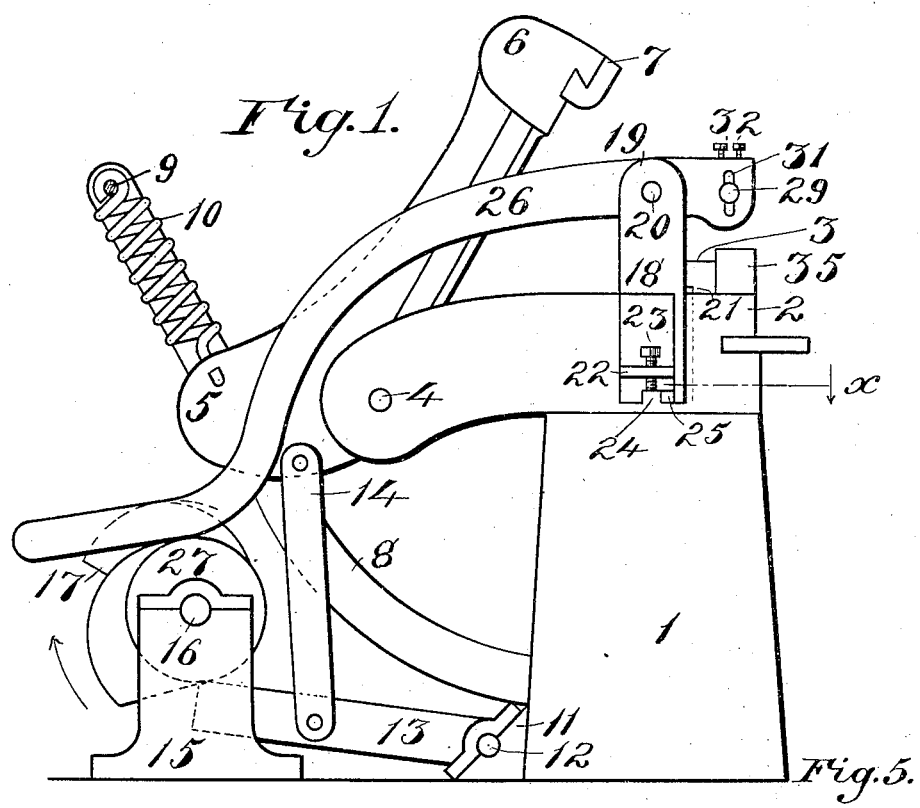
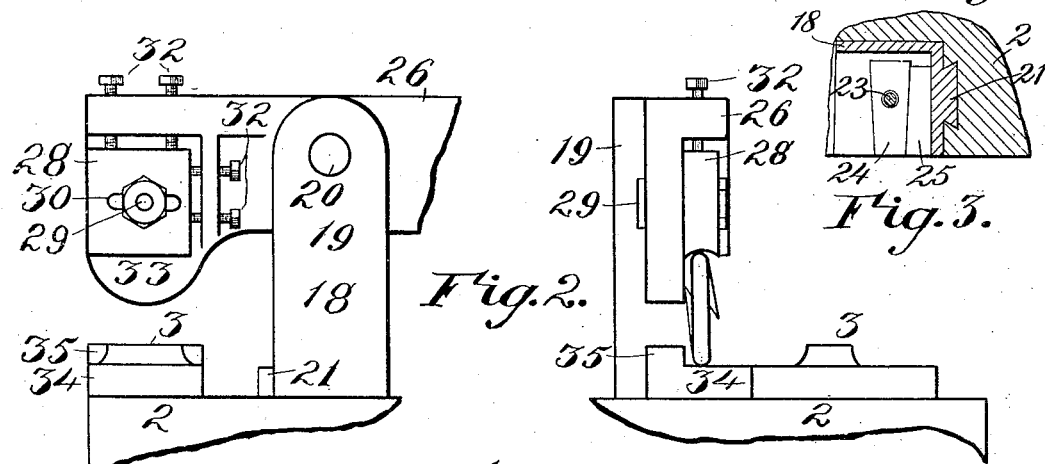
Witnesses:
Edna Bartz
Glenara Fox
Inventor:
W. N. Appleton,
by C. E. Humphrey,
Atty.

UNITED STATES PATENT OFFICE.

WALLACE N. APPLETON, OF KENT, OHIO, ASSIGNOR OF ONE-SIXTH TO GEORGE L. DARROW, OF HUDSON TOWNSHIP, OHIO, AND ONE-SIXTH TO WILLIAM T. VAUGHAN, OF AKRON, OHIO.

LINK-CLOSING DEVICE.

No. 835,696.  Specification of Letters Patent.  Patented Nov. 13, 1906.

Application filed December 1, 1905. Serial No. 289,879.

*To all whom it may concern:*

Be it known that I, WALLACE N. APPLETON, a citizen of the United States, residing at Kent, in the county of Portage and State of Ohio, have invented new and useful Improvements in Link-Closing Devices, of which the following is a specification.

My invention has relation to machines for shaping chain-links preparatory to the welding thereof.

The object of this invention is to bring the ends of chain-links into proper shape by the use of suitable devices, so that the strokes of the power-hammer will properly weld them together.

Chain-links as customarily furnished to the chain-maker have the scarfed ends which are to be welded together so separated that additional work is required to bring them into proper condition before the welding process takes place; and therefore the primary object of this invention is to provide a suitable tool which will effectually shape the links when heated for welding so quickly that one heating thereof suffices.

The invention further aims to place this mechanism in such a position with respect to a welding-hammer that it may be operated by the power ordinarily used in the operation of the hammer and so close to the dies used in welding the link as to make the use thereof exceedingly convenient and readily serviceable to the chain-maker.

With the foregoing and other objects in view the invention consists of the novel construction, combination, and arrangement of parts constituting the invention to be hereinafter referred to, and illustrated in the accompanying drawings, which form a part of this specification, in which is shown the preferred embodiment of the invention; but it is to be understood that changes, variations, and modifications can be resorted to which come within the scope of the claim hereunto appended.

In the drawings, in which similar reference-numerals indicate like parts in the different figures, Figure 1 is a side elevation of my improved device. Fig. 2 is an enlarged detail of that portion of my device by which the links are shaped. Fig. 3 is a front elevation looking from the left of Fig. 2. Fig. 4 is a plan of an ordinary chain-link before being operated upon by this device, and Fig. 5 is a section on line x of Fig. 1.

Before giving a detail description of this device it will be stated that I prefer to attach the same to the frame of a power-hammer of the type shown and described in United States Letters Patent granted to me January 19, 1904, and numbered 749,912.

In the drawings, 1 represents the base or foundation block of the device, which is suitably supported upon a floor or other foundation. This base is preferably made hollow, of cast-iron of sufficient strength and rigidity to withstand the stroke incident to the operation of the hammer, to be described later.

On top of the base 1 is an anvil-block 2, retained by any suitable means, such as bolts or other equivalent devices. On the upper part of this anvil-block 2 is the die 3, commonly known as the "nipple," around which the link is welded under the strokes of the hammer. The rear end of the anvil-block 2 is bifurcated, and between the two arms thereof extends a pivot 4, on which is mounted the hammer-helve 5. On the upper end of this helve is the hammer-head 6, bearing a die 7, which is adapted to coöperate with the nipple 3 in welding the chain-links.

Extending from one side of the base 1 are two arms 8, connected at their upper ends by a cross-rod 9, to which is attached a coiled spring 10, the lower end of which is adapted to engage the extended free end of the helve portion 5 of the hammer. In the drawings only one of these arms 9 is shown, the other being omitted to better illustrate the mechanism of the device. The tendency of the spring 10 is to draw upward the end of the hammer-helve to which it is attached and produce a corresponding downward stroke of the head portion 6 of the hammer. To the lower rear portion of the base 1 are attached journal-boxes 11, between which extends a transverse shaft 12, to the central portion of which is united an oscillating arm 13, which is connected by a pair of links 14 to the lower portion of the hammer-helve 5.

Mounted in proper position with respect to the position of the hereinbefore-mentioned mechanism are a pair of upright hangers 15, rotatably sustaining in their upper ends a shaft 16, on which is mounted a cam 17, so positioned as to engage the outer free end of the oscillating arm 13. Power is communicated to this shaft 16 in any suitable way, such as by means of a belt and pulley or any other way which may be deemed preferable by the operator. As the cam 17 revolves in the direction of the arrow, it gradually depresses the outer end of the oscillating arm 13, which being pivoted on the shaft 12 produces a downward movement in the links 14, which, overcoming the influence of the coiled spring 10, gradually raises the head portion 6 of the hammer until the cut-away portion of the cam 17 passes the oscillating arm 13, at which time the head of the hammer descends upon the nipple 3 with the combined force of gravity and energy of the spring 10.

Of course it will be obvious that as long as the revolution of the cam is maintained the hammer will rise and fall. Any suitable means may be used for maintaining the hammer-head at the upper end of its stroke which will best subserve the purposes of the user of this device; but as this forms no part of this invention its incorporation into this case is not believed to be necessary.

I find in practice that it is preferable to mount my improved link-forming device as close to the nipple 3 as possible, so that the link may be shaped while at a welding heat and may be turned over and placed in operative relation with the nipple 3 to be immediately acted upon by the die 7, carried by the hammer-head 6.

To properly shape the links as before described, I employ the following mechanism: In a cut-out portion of the anvil-block 2, whose sides are substantially at right angles to each other, I place a fulcrum-block 18, having a bifurcated upper end 19, through which passes a pivot-pin 20. The lower portion of this fulcrum-block is formed into an angle-plate and fits in the right-angled opening formed in the anvil-block 2. The front face of this post is provided with a dovetail strip integral therewith, (designated by the reference-numeral 21,) and this is adapted to enter a correspondingly-formed opening in the anvil-block 2, whereby the fulcrum-block is permitted to slide vertically, but is held against unintentional lateral displacement. Across the lower portion of the open part of this fulcrum-block is a web 22, provided with a threaded opening through which passes an adjusting-screw 23, the threads of which mesh in the threads in the opening in the web 22, and the lower end of this screw 23 enters an upturned lug 24, integral with the anvil-block 2, and is there held by any of the ordinary devices for rotatably retaining the end of a screw.

When it is desired to raise the entire fulcrum-block 18, a suitable tool is applied to the upper end of the screw 23, and it is rotated in a direction to cause the fulcrum-block to rise, due to the engagement of the threads on the screw 23 with the threads in the opening in the web 22, and as the lower end of the screw is held against depression by reason of its engagement with the lug 24 the fulcrum-block is caused to rise. In order to lower the fulcrum-block 18, the reverse of the foregoing operation is employed.

In order to effectually maintain the fulcrum-block in position and add materially to its strength, I insert between the lug 24 and the side of the fulcrum-block a wedge-block 25, which forces that side of the post into close engagement with that side of the opening into which it is to seat.

Pivoted on the pin 20 in the upper bifurcated end of the fulcrum-block is an oscillating lever 26, the rear end of which is formed, preferably, upon curvilinear lines and is downwardly bent and adapted to ride upon a cam 27, mounted on the shaft 16. The operation of this cam 27 is to alternately raise the rear end of the oscillating lever 26 and force downward the front or working end thereof.

The mechanism for engaging the link and holding it during its bending consists of a jaw 28, fastened, by means of a bolt 29, to the lever 26. This bolt 29 passes through a longitudinal slot 30 in the jaw 28 and also through a vertical slot 31 in the head of the lever 26, so that the relative position of the jaw 28 on the lever 26 may be adjusted. The place where the jaw 28 engages the lever 26 is hollowed out to receive it, and through the metal surrounding this hollowed-out portion, in which the jaw 28 is placed, are passed a number of adjusting-screws 32, by which the position of the jaw 28 is regulated and effectually maintained.

I prefer to concave the under face of the jaw 28, so as to better engage the links; but this is not absolutely necessary. A portion 33 of the lever 26 depends below the jaw and serves as a stop or guide for the placing of the links when operated upon by the jaw, as will be later described. Immediately below the jaw 28 on the anvil-block 2 is placed a block 34, fastened to the anvil-block by any suitable means and immediately adjacent the nipple 3. This block 34 is provided on one side with an upturned stop or guide 35, which is in vertical alinement with the portion 33 of the lever 26.

The operation of this device is as follows; The links are taken from the forge fire, heated to a welding heat, in the form shown in Fig. 4, the scarfed end being spread apart when the links are formed or wound originally. The operator then inserts each heated link through the end link of the chain, to which this link will be added as a component part, and places it, preferably by sliding sidewise, under the jaw 28. In doing this the operator will be assisted and the link guided to a proper position by means of the depending portion 33 of the lever and the upturned stop 35 of the block 34. The placing of the link under the jaw 28 will of course take place when the front end of the lever is raised, and on its downward stroke it will so press the link that the side portions thereof will be made approximately parallel. Then by a very slight movement on the part of the operator the link is turned sidewise over the nipple 3, and a trip is operated by which the movement of the welding-hammer is induced, which effectually welds the scarfed ends of the links together. This operation is repeated for each and every link. The placing of this mechanism in immediate proximity to the welding-hammer avoids any delay in the forming of a link previous to the welding thereof.

What I claim, and desire to secure by Letters Patent, is—

The combination in a device of the class described, of a supporting-block, a stationary die mounted thereon provided with a link-guide, a fulcrum-block slidably mounted in suitable ways in said supporting-block, means to raise and lower said fulcrum-block, a rocking lever pivoted in the upper end of said fulcrum-block, a shaft suitably mounted adjacent said supporting-block, a cam on said shaft arranged to engage one end of said lever, and a die mounted on the opposite end of said lever arranged to engage link-blanks held on said stationary die.

In testimony whereof I have hereunto set my hand in presence of two subscribing witnesses.

WALLACE N. APPLETON.

Witnesses:
C. E. HUMPHREY,
GLENARA FOX.